(12) United States Patent
Proctor, Jr.

(10) Patent No.: US 9,344,220 B2
(45) Date of Patent: *May 17, 2016

(54) FORWARD ERROR CORRECTION SCHEME FOR HIGH RATE DATA EXCHANGE IN A WIRELESS SYSTEM

(75) Inventor: James A. Proctor, Jr., Melbourne, FL (US)

(73) Assignee: IPR Licensing, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/278,691

(22) Filed: Oct. 21, 2011

(65) Prior Publication Data

US 2012/0042223 A1    Feb. 16, 2012

Related U.S. Application Data

(63) Continuation of application No. 12/110,930, filed on Apr. 28, 2008, now Pat. No. 8,045,536, and a continuation of application No. 10/634,148, filed on Aug. 4, 2003, now Pat. No. 7,366,154, and a continuation of application No. 09/301,484, filed on Apr. 28, 1999, now Pat. No. 6,614,776.

(51) Int. Cl.
*H04B 7/216* (2006.01)
*H04L 1/00* (2006.01)

(52) U.S. Cl.
CPC ............ *H04L 1/0066* (2013.01); *H04L 1/0041* (2013.01)

(58) Field of Classification Search
CPC ................ H04B 1/707; H04B 7/2628; H04B 2201/70701

USPC ......... 370/342, 320, 329, 334, 335, 441, 535, 370/536, 541, 542; 375/146
See application file for complete search history.

(56) References Cited

U.S. PATENT DOCUMENTS

| 4,460,992 A | 7/1984 | Gutleber |
| 4,625,308 A | 11/1986 | Kim et al. |
| 4,862,453 A | 8/1989 | West et al. |
| 4,866,709 A | 9/1989 | West et al. |
| 5,027,348 A | 6/1991 | Curry et al. |

(Continued)

FOREIGN PATENT DOCUMENTS

| EP | 0443061 | 2/1990 |
| EP | 0635949 | 7/1994 |

(Continued)

OTHER PUBLICATIONS

Attachment 2, High Speed Data RLP Lucent Technologies, Version 0.1, Jan. 16, 1997.

(Continued)

*Primary Examiner* — Wesley Kim
*Assistant Examiner* — Richard Chan
(74) *Attorney, Agent, or Firm* — Volpe and Koenig, P.C.

(57) ABSTRACT

A transmitter/receiver system for high data transfer in a wireless communication system includes a physical layer processor that comprises an FEC coder, a demultiplexer and a plurality of modem processors. The FEC coder applies error correction codes to the high data rate signal. Thereafter, the demultiplexer distributes portions of the coded high data rate signal to the modem processors. Each modem processor processes its respective portion of the coded signal for transmission in an independent channel.

8 Claims, 1 Drawing Sheet

(56) References Cited

U.S. PATENT DOCUMENTS

| | | | |
|---|---|---|---|
| 5,103,459 A | 4/1992 | Gilhousen et al. | |
| 5,115,309 A | 5/1992 | Hang | |
| 5,373,502 A | 12/1994 | Turban | |
| 5,394,473 A | 2/1995 | Davidson | |
| 5,410,538 A | 4/1995 | Roche et al. | |
| 5,414,728 A | 5/1995 | Zehavi | |
| 5,442,625 A | 8/1995 | Gitlin et al. | |
| 5,487,072 A | 1/1996 | Kant | |
| 5,559,788 A | 9/1996 | Zscheile, Jr. et al. | |
| 5,559,790 A | 9/1996 | Yano et al. | |
| 5,602,834 A | 2/1997 | Dean et al. | |
| 5,606,574 A | 2/1997 | Hasegawa et al. | |
| 5,608,725 A | 3/1997 | Pendleton et al. | |
| 5,663,958 A | 9/1997 | Ward | |
| 5,663,990 A | 9/1997 | Bolgiano et al. | |
| 5,673,259 A | 9/1997 | Quick, Jr. | |
| 5,699,364 A | 12/1997 | Sato et al. | |
| 5,699,369 A | 12/1997 | Guha | |
| 5,734,646 A | 3/1998 | I et al. | |
| 5,777,990 A | 7/1998 | Zehavi et al. | |
| 5,781,542 A | 7/1998 | Tanaka et al. | |
| 5,784,406 A | 7/1998 | DeJaco et al. | |
| 5,790,551 A | 8/1998 | Chan | |
| 5,805,567 A | 9/1998 | Ramesh | |
| 5,812,938 A | 9/1998 | Gilhousen et al. | |
| 5,825,807 A | 10/1998 | Kumar | |
| 5,828,659 A | 10/1998 | Teder et al. | |
| 5,828,662 A | 10/1998 | Jalali et al. | |
| 5,842,125 A * | 11/1998 | Modzelesky et al. | 455/426.1 |
| 5,844,894 A | 12/1998 | Dent | |
| 5,856,971 A | 1/1999 | Gitlin et al. | |
| 5,859,840 A | 1/1999 | Tiedemann, Jr. et al. | |
| 5,862,133 A | 1/1999 | Schilling | |
| 5,864,546 A * | 1/1999 | Campanella | 370/316 |
| 5,867,490 A * | 2/1999 | Campanella | 370/326 |
| 5,910,945 A | 6/1999 | Garrison et al. | |
| 5,914,950 A | 6/1999 | Tiedemann, Jr. et al. | |
| 5,917,852 A | 6/1999 | Butterfield et al. | |
| 5,923,650 A | 7/1999 | Chen et al. | |
| 5,930,230 A | 7/1999 | Odenwalder et al. | |
| 5,950,131 A | 9/1999 | Vilmur | |
| 5,991,279 A | 11/1999 | Haugli et al. | |
| 5,991,308 A * | 11/1999 | Fuhrmann et al. | 370/395.53 |
| 6,005,855 A | 12/1999 | Zehavi et al. | |
| 6,028,868 A | 2/2000 | Yeung et al. | |
| 6,061,359 A | 5/2000 | Schilling et al. | |
| 6,064,678 A | 5/2000 | Sindhushayana et al. | |
| 6,069,883 A | 5/2000 | Ejzak | |
| 6,078,572 A | 6/2000 | Tanno et al. | |
| 6,088,335 A | 7/2000 | I et al. | |
| 6,104,708 A | 8/2000 | Bergamo | |
| 6,112,083 A * | 8/2000 | Sweet et al. | 455/426.1 |
| 6,112,092 A | 8/2000 | Benveniste | |
| 6,134,233 A | 10/2000 | Kay | |
| 6,151,332 A | 11/2000 | Gorsuch et al. | |
| 6,157,619 A | 12/2000 | Ozluturk et al. | |
| 6,161,013 A | 12/2000 | Anderson et al. | |
| 6,195,362 B1 | 2/2001 | Darcie et al. | |
| 6,201,798 B1 * | 3/2001 | Campanella et al. | 370/326 |
| 6,208,871 B1 | 3/2001 | Hall et al. | |
| 6,215,798 B1 | 4/2001 | Carneheim et al. | |
| 6,222,828 B1 | 4/2001 | Ohlson et al. | |
| 6,236,647 B1 | 5/2001 | Amalfitano et al. | |
| 6,243,372 B1 | 6/2001 | Petch et al. | |
| 6,259,683 B1 | 7/2001 | Sekine et al. | |
| 6,259,724 B1 | 7/2001 | Esmailzadeh | |
| 6,262,971 B1 | 7/2001 | Schilling | |
| 6,262,980 B1 | 7/2001 | Leung et al. | |
| 6,269,088 B1 | 7/2001 | Masui et al. | |
| 6,272,168 B1 | 8/2001 | Lomp et al. | |
| 6,272,338 B1 * | 8/2001 | Modzelesky et al. | 455/430 |
| 6,285,665 B1 | 9/2001 | Chuah | |
| 6,298,463 B1 | 10/2001 | Bingeman et al. | |
| 6,307,840 B1 | 10/2001 | Wheatleyl, III et al. | |
| 6,366,570 B1 | 4/2002 | Bhagalia | |
| 6,373,830 B1 | 4/2002 | Ozluturk | |
| 6,373,834 B1 | 4/2002 | Lundh et al. | |
| 6,377,548 B1 | 4/2002 | Chuah | |
| 6,377,809 B1 | 4/2002 | Rezaiifar et al. | |
| 6,389,000 B1 | 5/2002 | Jou | |
| 6,396,804 B2 | 5/2002 | Odenwalder | |
| 6,418,148 B1 | 7/2002 | Kumar et al. | |
| 6,456,608 B1 | 9/2002 | Lomp | |
| 6,469,991 B1 | 10/2002 | Chuah | |
| 6,473,417 B1 | 10/2002 | Herzog | |
| 6,473,623 B1 | 10/2002 | Benveniste | |
| 6,504,830 B1 | 1/2003 | Östberg et al. | |
| 6,515,981 B1 | 2/2003 | Schilling et al. | |
| 6,519,651 B1 | 2/2003 | Dillon | |
| 6,526,039 B1 | 2/2003 | Dahlman et al. | |
| 6,532,365 B1 | 3/2003 | Anderson et al. | |
| 6,545,986 B1 | 4/2003 | Stellakis | |
| 6,567,416 B1 | 5/2003 | Chuah | |
| 6,570,865 B2 | 5/2003 | Masui et al. | |
| 6,571,296 B1 | 5/2003 | Dillon | |
| 6,574,211 B2 | 6/2003 | Padovani et al. | |
| 6,590,873 B1 | 7/2003 | Li et al. | |
| 6,594,322 B2 * | 7/2003 | Dapper et al. | 375/330 |
| 6,597,913 B2 | 7/2003 | Natarajan | |
| 6,614,776 B1 * | 9/2003 | Proctor, Jr. | 370/342 |
| 6,647,057 B1 * | 11/2003 | Caldwell et al. | 375/220 |
| 6,850,506 B1 | 2/2005 | Holtzman et al. | |
| 6,885,652 B1 | 4/2005 | Ozukturk et al. | |
| 6,940,840 B2 | 9/2005 | Ozluturk et al. | |
| 6,973,601 B2 | 12/2005 | Sabet et al. | |
| 7,133,441 B1 * | 11/2006 | Barlev et al. | 375/222 |
| 7,149,223 B2 * | 12/2006 | Liva et al. | 370/401 |
| 7,154,914 B1 * | 12/2006 | Pechner et al. | 370/516 |
| 7,209,709 B2 | 4/2007 | Miyazaki et al. | |
| 7,257,147 B1 | 8/2007 | Mack et al. | |
| 7,263,089 B1 | 8/2007 | Hans et al. | |
| 7,289,476 B2 | 10/2007 | Varshney et al. | |
| 7,324,563 B2 * | 1/2008 | Loeffler et al. | 370/535 |
| 7,327,775 B1 | 2/2008 | Gu | |
| 7,366,154 B2 * | 4/2008 | Proctor, Jr. | 370/342 |
| 7,636,382 B1 | 12/2009 | Mack et al. | |
| 8,045,536 B2 | 10/2011 | Proctor, Jr. | |

FOREIGN PATENT DOCUMENTS

| | | |
|---|---|---|
| EP | 0720309 | 7/1996 |
| EP | 0827312 | 8/1997 |
| FR | 2266389 | 4/1974 |
| FR | 2761557 | 3/1997 |
| WO | 95/08900 | 3/1995 |
| WO | 96/13914 | 5/1996 |
| WO | 96/27250 | 9/1996 |
| WO | 97/26726 | 7/1997 |
| WO | 98/43373 | 10/1998 |
| WO | 98/59447 | 12/1998 |
| WO | 9909674 A2 | 2/1999 |
| WO | 99/14878 | 3/1999 |
| WO | 99/39472 | 8/1999 |
| WO | 99/44341 | 9/1999 |
| WO | 00/52831 | 9/2000 |
| WO | 00/65764 | 11/2000 |

OTHER PUBLICATIONS

Azad et al., "Multirate Spread Spectrum Direct Sequence CDMA Techniques," 1994, The Institute of Electrical Engineers.

Bell Labs Technical Journal, Lucent Technologies, vol. 2, No. 3, Summer 1997.

Budka et al., "Cellular Digital Packet Data Networks," Bell Labs Technical Journal, Summer 1997, pp. 164-181.

Cellular Digital Packet Data, System Specification, Release 1.1 Jan. 19, 1995.

Chen Q et al., "Multicarrier CDMA With Adaptive Frequency Hopping for Mobile Radio Systems", IEEE Journal on selected areas in communications, vol. 14, No. 9, Dec. 1996, pp. 1852-1858, XP000639647.

(56) References Cited

OTHER PUBLICATIONS

Chung, "Packet Synchronization and Identification for Incremental Redundancy Transmission in FH-CDMA Systems," 1992, IEEE, pp. 292-295.
Data Service Options for Wideband Spread Spectrum Systems. TIA/EIA Interim Standard. TIA/EIA/IS-707-A. Apr. 1999.
Data Service Options for Wideband Spread Spectrum Systems: Introduction, PN-3676. 1 (to be published as TIA/EIA/IS-707.1), Mar. 20, 1997 (Content Revision 1).
Data Services Option Standard for Wideband Spread Spectrum Digital Cellular System. TIA/EIA/IS-99. TIA/EIA Interim Standard. Jul. 1995.
Data Services Options Standard for Wideband Spread Spectrum Systems: Packet Data Services. PN-3676.5 (to be published as TIA/EIA/IS-707.5) Ballot Version, May 30, 1997.
Data Standard, Packet Data Section, PN-3676.5 (to be published as TIA/EIA/IS-DATA.5), Dec. 8, 1996, Version 02 (Content Revision 03).
Draft Text for "95C" Phyical Layer. (Revision 4), Part 1, Document #531-981-20814-95C, part 1 on 3GGP2 website (ftp://ftp.3gpp2.org/tsgc/working/1998/1298_Maui/WG3-TG1/531-9812014-95c,%20part5202.pdf,1998).
Draft Text for "95C" Phyical Layer. (Revision 4), Part 2, Document #531-981-20814-95C, part 2 on 3GGP2 website (ftp://ftp.3gpp2.org/tsgc/working/1998/1298_Maui/WG3-TG1/531-9812014-95c,%20part5202.pdf,1998).
Ejzak et al., "Lucent Technologies Air Interface Proposal for CDMA High Speed Data Service," Revision 0.1, May 5, 1997.
Ejzak et al., "Lucent Technologies Air Interface Proposal for CDMA High Speed Data Service," Apr. 14, 1997.
Ejzak, et al. "Proposal for High Speed Packet Data Service, Version 0.1," Lucent Technologies, Jan. 16, 1997.
Elhakeem, "Congestion Control in Signaling Free Hybrid ATM/CDMA Satellite Network," IEEE, 1995, pp. 783-787.
Goodman, "Wireless Personal Communications Systems," (1997).
Hagenauer, "Rate-Compatible Puncture Convolutional Codes (RCPC Codes) and their Applications," IEEE Transactions on Communications, 36 (4): pp. 389-400 (Apr. 1988).
Hall et al., "Design and Analysis of Turbo Codes of Rayleigh Fading Channels," IEEE Journal on Selected Areas in Communications, vol. 16, No. 2, Feb. 1998, pp. 160-174.
High Data Rate (HDR) Solution, Qualcomm, Dec. 1998.
High Data Rate (HDR), cdmaOne optimized for high speed, high capacity data, Wireless Infrastructure, Qualcomm, Sep. 1998.
Hindelang et al., "Using Powerful "Turbo" Codes for 14.4 Kbit/s Data Service in GSM or PCS Systems," IEEE Global Communications Conference, Phoenix, Arizona, USA Nov. 3-8, 1997 vol. 11, pp. 649-653.
Honkasalo, Harri, "High Speed Data Air Interface," 1996.
I et al., "Multi-Code CDMA Wireless Personal Communications Networks", Proceedings IEEE ICC 1995: 1060-1064.
I et al., "IS-95 Enhancements for Multimedia Services," Bell Labs Technical Journal, pp. 60-87, Autumn 1996.
I et al., "Load and Interference Based Demand Assignment (LIDA) for Integrated Services in CDMA Wireless Systems," Nov. 18, 1996, pp. 235-241.
I et al., "Performance of Multi-Code CDMA Wireless Personal Communications Networks," Jul. 25, 1995.
I et al., "Variable Spreading Gain CDMA with Adaptive Control for True Packet Switching Wireless Network," 1995, pp. 725-730.
Introduction to cdma2000 Spread Spectrum Systems, Release C. TIA/EIA Interim Standard. TIA/EIA/IS-2000.1-C. May 2002.
Kaiser et al., "Multi-Carrier CDMA with Iterative Decoding and Soft-Interference Cancellation", IEEE Global Communications Conference, Phoenix, AZ, USA, vol. I: 523-529, (Nov. 3-8, 1997).
Knisely, "Lucent Technologies Air Interface Proposal for CDMA High Speed Data Service," Jan. 16, 1997.
Knisely, "Telecommunications Industry Association Subcommittee TR-45.5—Wideband Spread Spectrum Digital Technologies Standards," Banff, Alberta. Feb. 24, 1997 (TR45.5/97.02.24)21.
Knisely, "Telecommunications Industry Association Subcommittee TR-45.5—Wideband Spread Spectrum Digitial Technologies Standards," Working Group III—Physical Layer. Banff, Alberta. Feb. 24, 1997 (TR45.5/97.02.24)22.
Kryzmien et al., "Rapid Acquisition Algorithms for Synchronization of Bursty Transmissions in CDMA Microcellular and Personal Wireless Systems," IEEE Journal on Selected Areas in Communications, vol. 14, No. 3, Apr. 1996, pp. 570-579.
Kumar et al., "An Access Scheme for High Speed Packet Data Service on IS-95 based CDMA," Feb. 11, 1997.
Lau et al., "A Channel-State-Dependent Bandwidth Allocation scheme for Integrated Isochronous and Bursty Media Data in a Cellular Mobile Information System," IEEE, 2000, pp. 524-528.
Lin, S., et al., "Automatic-Repeat-Request Error-Control Schemes," IEEE Communications Magazine, 22 (12): pp. 5-17 (Dec. 1984).
Liu et al., "Channel Access and Interference Issues in Multi-Code DS-CDMA Wireless Packet (ATM) Networks," Wireless Networks 2, pp. 173-196, 1996.
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.
Mobile Station-Base Station Compatibility Standard for Wideband Spread Spectrum Cellular Systmes, TIA/EIA Standard, TIA/EIA/IS-95-B (Addendum to TIA/EIA/IS-95-A), Mar. 1999.
Motorola, Version 1.0. Motorola High Speed Data Air Interface Proposal Comparisions and Recommendations. Jan. 27, 1997.
MSC-BS Interface (A-Interface) for Public 800 MHz. TIA/EIA/IS-634-A. TIA/EIA Interim Standard (Revision of TIA/EIA/IS-634) Jul. 1998.
MSC-BS Interface for Public 800 MHz.TIA/EIA/IS-634. TIA/EIA Interim Standard, Dec. 1995.
Network Wireless Systems Offer Business unit (NWS OBU), Feature Definition Document for Code Division Multiple Access (CDMA) Packet Mode Data Services, FDD-1444, Nov. 26, 1996.
Ott, "TR45.5, CDMA WBSS Technical Standards Meeting Summary," Feb. 24-28, 1997 Banff, Alberta.
Packet Data service Option Standard for Wideband Spread Spectrum Systems, TIA/EIA Interim Standard, TIA/EIA/IS-657, Jul. 1996.
Physical Layer Standard for cdma2000 Spread Spectrum Systems, Release C. TIA/EIA Interim Standard. TIA/EIA/IS-2000.2C. May 2002.
Pulleston, "PPP Protocol Spoofing Control Protocol," Global Village Communication (UK) Ltd., Feb. 1996.
Reed et al., "Iterative Multiuser Detection for CDMA with FEC: Near-Single-User Performance," IEEE Transactions on Communications, vol. 46, No. 12, Dec. 1998, pp. 1693-1699.
Shacham, et al., "A Selective-Repeat-ARQ Protocol for Parallel Channels and Its Resequencing Analysis," IEEE Transactions On Communications, XP000297814, 40 (4): 773-782 (Apr. 1997).
Shacham, N., "A Selective-Repeat-ARQ Protocol for Parallel Channels and Its Resequencing Analysis," IEEE Transactions on Communications, 40 (4): pp. 773-782 (Apr. 1992).
Simpson, W. (Editor). "RFC 1661—The Point-to-Point Protocol (PPP)." Network Working Group, Jul. 1994, pp. 1-35. http://www.faqs.org/rfcs/rfc1661.html.
Simpson, W. (Editor). "RFC 1662—PPP in HDLC-Like Framing." Network Working Group, Jul. 1994, pp. 1-17. http://www.faqs.org/rfcs/rfc1662.html.
Skinner et al., "Performance of Reverse-Link Packet Transmission in Mobile Cellular CDMA Networks," IEEE, 2001, pp. 1019-1023.
Stage 1 Service Description for Data Services—High Speed Data Services (Version 0.10) CDG RF 38. Dec. 3, 1996.
Support for 14.4 kbps Data Rate and PCS Interaction for Wideband Spread Spectrum Cellular Systems. TSB74, Dec. 1995. TIA/EIA Telecommunications Systems Bulletin.
*Tantivy Communication, Inc.* v. *Lucent Technologies, Inc.* Markman Order Civil Action No. 2:04-CV-79 (Aug. 11, 2005).

(56) References Cited

OTHER PUBLICATIONS

Telecommunications Industry Association Meeting Summary. Task Group I, Working Group III, Subcommittee TR45.5. Feb. 24-27, 1997. Banff, Alberta.

Telecommunications Industry Association Meeting Summary. Task Group I, Working Group III, Subcommittee TR45.5. Jan. 6-8, 1997. Newport Beach, California. (Tiedemann, pp. 4-8).

Third Generation Partnership Project, "Technical Specification Group (TSG) Radio Access Network (RAN); Working Group 1 (WG1); Physical Channels and Mapping of Transport Channels onto Physical Channels (FDD)," 3GPP TS 25.211 v2.0.0 (Apr. 1999).

Third Generation Partnership Project, "Technical Specification Group (TSG) Radio Access Network (RAN); Working Group 1 (WG1); Multiplexing and Channel Coding (FDD)," 3GPP TS 25.212 v1.0.0 (Apr. 1999).

Third Generation Partnership Project, "Technical Specification Group (TSG) Radio Access Network (RAN); Working Group 1 (WG1); Spreading and Modulation (FDD)," 3GPP TS 25.213 v2.0.0 (Apr. 1999).

Upper Layer (Layer 3) Signaling Standard for cdma2000 Spread Spectrum Systems, Release C. TIA/EIA Interim Standard. TIA/EIA/IS-2000.5-C. May 2002.

Viterbi, "A Constructive (Backward Compatible) Approach for Migration to Wider Band Wireless Services," Qualcomm Incorporated, $3^{rd}$ Generation Wider Band CDMA Technology Conference, Atlanta, Georgia, Feb. 25, 1998.

Viterbi, "The Path to Next Generation Services with CDMA Qualcomm Incorporated," 1998 CDMA Americas Congress, Los Angeles, California, Nov. 19, 1998.

Wang et al., "The Performance of Turbo-Codes in Asynchronous DS-CDMA," IEEE Global Communications Conference, Phoenix, Arizona, USA, Nov. 3-8, 1007, vol. III, pp. 1548-1551.

Wang, et al, "Spread Spectrum Multiple-Access with DPSK Modulation and Diversity for Image Transmission over Indoor Radio Multipath Fading Channels," IEEE Transactions on Circuits and Systems for Video Technology, 6 (2): 200-214 (1996).

www.cdg.org/news/press/1997.asp. CDA Press Release Archive, 1997.

\* cited by examiner

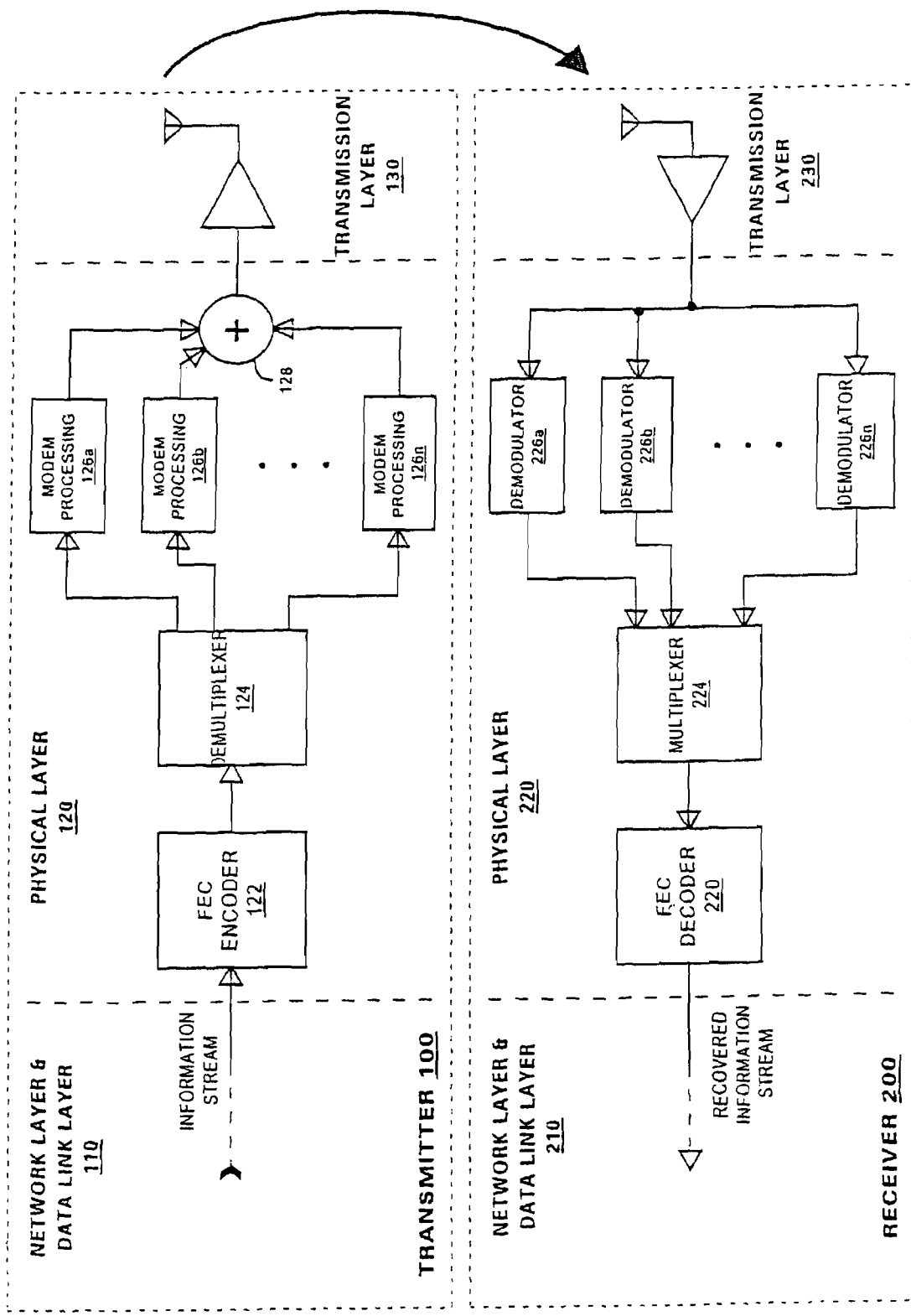

FORWARD ERROR CORRECTION SCHEME FOR HIGH RATE DATA EXCHANGE IN A WIRELESS SYSTEM

RELATED APPLICATIONS

This application is a continuation of U.S. patent application Ser. No. 12/110,930 filed on Apr. 28, 2008 which issued as U.S. Pat. No. 8,045,336 on Oct. 25, 2011, which is a continuation of U.S. patent application Ser. No. 10/634,148 filed on Aug. 4, 2003 which issued as U.S. Pat. No. 7,366,154 on Apr. 29, 2008, which is a continuation of U.S. patent application Ser. No. 09/301,484 filed on Apr. 28, 1999 which issued as U.S. Pat. No. 6,614,776 on Sep. 2, 2003, which was reexamined in Control No. 90/008,982, which issued as U.S. Pat. No. 6,614,776 C1, on May 24, 2011, all of which are incorporated herein by reference as if fully set forth.

BACKGROUND OF THE INVENTION

The present invention provides a low latency error correction mechanism for high data rate transmissions over multiple traffic channels in a wireless communication system.

It is known to include forward error correction ("FEC") coding and decoding to information signals that are to be transmitted over a wireless channel. Forward error correction, generally speaking, introduces predetermined redundancy into an information signal to permit a receiver to identify and perhaps correct errors that may have been introduced by a transmission medium. For example, the known IS-95 standard for code division multiple access cellular communication specifies a type of convolutional code for each traffic channel transmitted from base station to mobile station or vice versa.

Recently, it has been proposed to provide high data rate exchanges over a wireless communication system. Such high data rate exchanges may be used, for example, to facilitate data transfer for computing applications or for video conferencing applications. In one such proposal, a high rate data signal may be communicated to a receiver over a plurality of parallel traffic channels. For example, the recently proposed IS-95 B standard proposes use of parallel CDMA channels each having a data rate of 9.6 KB/s to provide a higher data rate communication. In such systems, a high rate data signal is demultiplexed into a plurality of lower rate data signals and each of these signals is processed in an independent traffic channel. Thus, each lower rate data signal has FEC applied to it.

Another example of a wireless CDMA system providing multiple parallel traffic channels for high data rate exchange may be found in issued U.S. Pat. No. 6,151,332, entitled "Protocol Conversion and Bandwidth Reduction Technique Providing Multiple nB+D ISDN Basic Rate Interface Links Over a Wireless Code Division Multiple Access Communication System," the disclosure of which is incorporated herein.

Wireless communication channels are inherently "noisy" due to channel impairments caused by atmospheric conditions, multipath effects, co-channel interference and the like. Particularly if used for computing applications, where executable content may be expected to be exchanged over traffic channels, the need for powerful FEC techniques will continue to be prevalent.

Use of more powerful FEC techniques in such wireless systems may increase the latency of data requests. For example, the known turbo codes require large blocks of data to be received entirely by a decoder before decoding can begin. Latency refers generally to the delay that extends from the time a request for data is issued by a user and the time when data responsive to the request is presented to the user. FEC introduces decoding delays at a wireless receiver and, thus, contributes to latency. There is a need in the art for a wireless communication system that provides high data rate exchange having high quality FEC with low latency.

SUMMARY OF THE INVENTION

Embodiments of the present invention provide a transmitter/receiver system for high data transfer in a wireless communication system in which a physical layer processor comprises an FEC coder, a demultiplexer and a plurality of modem processors. The FEC coder applies error correction codes to the high data rate signal. Thereafter, the demultiplexer distributes portions of the coded high data rate signal to the modem processors. Each modem processor processes its respective portion of the coded signal for transmission in an independent channel.

BRIEF DESCRIPTION OF THE DRAWING

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 illustrates a transmitter and a receiver each constructed in accordance with embodiments of the present invention.

DETAILED DESCRIPTION OF THE INVENTION

The present invention provides low latency forward error correction for a high data rate wireless transmission by applying forward error correction codes to data prior to multiplexing the data across a plurality of parallel fixed bandwidth traffic channels.

FIG. 1 is a block diagram of a transmitter 100 and a receiver 200 each constructed according to embodiments of the present invention. The transmitter 100 and receiver 200 are illustrated as operating in a layered communication system that includes a transmission layer (130, 230), a physical layer (120, 220) and higher layer communications such as network layers and data link layers (collectively labeled 110 and 210). As is known, in the transmission layer 130, a transmitter 100 performs carrier modulation, amplification and transmission upon digital data to be transmitted. Also as is known, in the transmission layer 230, a receiver 200 performs reception, amplification and carrier demodulation to obtain a recovered digital data signal. The higher layers 110, 210 of the communication system also may process an information signal as may be required for the application for which the present invention is to be used.

According to an embodiment of the present invention, the physical layer 120 of the transmitter 100 may be populated by an FEC coder 122, a demultiplexer 124 and a plurality of modem processors 126a-126n. The number of modem processors 126a-126n may vary and also may be determined by the quantity of data to be transmitted and the capacity of each of the traffic channels over which the data may be transmitted. The FEC coder 122 receives a source signal from a higher layer 110 in the transmitter and enhances it with an error correction code. The enhanced information signal is output from the FEC coder 122 to the demultiplexer 124. The demultiplexer distributes the information signal to the modem processors 126a-126n. The modem processors 126a-126n each format their respective portions of the enhanced signal for transmission. Outputs from the modem processors 126a-126n are summed by an adder 128 and delivered to the transmission layer 130.

At the receiver 200, the physical layer 220 performs processing that is the inverse of the processing that had been applied in the physical layer 120 of the transmitter 100. The physical layer 220 may be populated by an FEC decoder 222, a multiplexer 224 and a plurality of demodulators 226a-226n. There will be one demodulator 226a-226n for each of the traffic channels that had been allocated to carry the enhanced information signal. The recovered digital signal from the transmission layer 230 is input to each of the demodulators 226a-226n. Each demodulator 226a-226n outputs a recovered portion of the enhanced information signal. The multiplexer 224 merges each of the recovered portions of the enhanced information signal into a unitary recovered enhanced information signal. The FEC decoder 222 performs error detection and correction using error correction codes that had been introduced by the FEC coder 122 in the transmitter 100. The FEC decoder 222 outputs a corrected information signal to the higher layers 210 of the receiver 200.

In a CDMA embodiment, which is shown in FIG. 1, a receiver 200 need not include an element corresponding to the adder 128 of the transmitter 100; the demodulators 226a-226n each perform correlation. As is known, correlation permits a modem processor to discriminate a desired CDMA signal from other CDMA signals that may be present in an aggregate received signal. Thus, in the embodiment of FIG. 1, the demodulators 226a-226n identify and output respective portions of the recovered enhanced information signal.

According to an embodiment of the present invention, the FEC coder 122 and FEC decoder 222 may generate and decode iterative systematic nested codes, also known as "turbo" codes. These turbo codes provide an advantage in that the FEC decoding process may be repeated iteratively to improve the information signal recovered therefrom. Thus, the output of a first iteration may be reintroduced to the FEC decoding block (path not shown in FIG. 1) for subsequent iterations. The nature of the turbo codes generates improved corrected data at subsequent iterations.

The known turbo codes, however, introduce a predetermined amount of latency into the decoding process. Turbo codes operate on blocks of a predetermined size. For example, one turbo code being considered for a wireless communication system for computer network applications possesses a block size of 4,096 channel symbols. An FEC decoder 222 must decode an entire block before a recovered information signal becomes available for the block. This characteristic may be contrasted with convolutional codes which are used in the known IS-95 standard for CDMA cellular communication; convolutional codes are characterized by relatively smaller latency for same-sized block (relative to turbo codes) because it is not necessary to receive an entire block before decoding may begin. It is believed that by distributing the FEC code among several parallel traffic channels as is shown in FIG. 1, the higher aggregate throughput of the traffic channels ameliorates the latency that would otherwise be introduced by the turbo code.

For high data rate applications using plural parallel traffic channels, it is believed that use of turbo codes achieves a higher figure of merit (lower $E_b/N_0$) than for convolutional codes. Using the example of a 4,096 channel symbol sized block and $E_b/N_0$ of 1.5 dB the turbo code provides a BER of $10^{-6}$. By contrast, for voice systems requiring a less stringent $10^{-3}$ BER, a convolutional code requires an $E_b/N_0$ of 7 dB or more.

The techniques of the present invention find application in a variety of wireless communication systems including CDMA systems. Typically, in application, the base stations and subscriber stations of the wireless communication system will include functionality of both the transmitter and receiver of FIG. 1. That is, to provide two-way communication, a base station will include a transmitter portion 100 and a receiver portion 200. So, too, with the subscriber terminal. The base stations and subscriber terminals may but need not be configured to provide simultaneous full-duplex communication.

Typically, a base station of a wireless communication system transmits a plurality of data signals to a variety of subscribers simultaneously. According to an embodiment of the present invention, each base station may perform the techniques disclosed herein simultaneously on a number of high rate data signals. It is consistent with the spirit and scope of the present invention that each signal may have a data rate that is independent of the data rates of the other signals. Thus, in such a case, a base station may be configured to include its FEC coder/decoders 122, 222 and modem processor/demodulators 126a, 226a in a pooled configuration. Such an embodiment permits the base station to assign, for example, a variable number of modem processors 126a-126n to a data signal depending upon the rate of the signal to be transmitted. Similarly, by including a pool of FEC coders 122 (shown singly in FIG. 1) in a base station, the base station may selectively enable FEC coders 122 as the base station receives new data signals to be transmitted to subscribers. Provision of base station processing components in a pooled arrangement is well-known.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A transmitter comprising:
   circuitry configured to produce by a link layer a single information stream; the circuitry is further configured to turbo code blocks of the single information stream;
   the circuitry is further configured to demultiplex the turbo coded blocks of the single information stream into a plurality of channels;
   the circuitry is further configured to process the plurality of channels to produce a respective plurality of code division multiple access (CDMA) channels; and
   the circuitry is further configured to combine the plurality of CDMA channels and transmit the combined plurality of channels using at least one antenna.

2. The transmitter of claim 1 wherein the single information stream is a high data rate information stream.

3. The transmitter of claim 1 wherein the turbo code blocks are of a predetermined size.

4. The transmitter of claim 1 wherein the turbo coding of the blocks is performed by one of a pool of forward error correction (FEC) coders.

5. A method for use by a transmitter, the method comprising:
   producing by a link layer a single information stream;
   turbo coding blocks of the single information stream;
   demultiplexing the turbo coded blocks of the single information stream into a plurality of channels;

processing the plurality of channels to produce a respective plurality of code division multiple access (CDMA) channels;
combining the plurality of CDMA channels; and
transmitting the combined plurality of CDMA channels.

6. The method of claim 5 wherein the single information stream is a high data rate information stream.

7. The method of claim 5 wherein the turbo code blocks are of a predetermined size.

8. The method of claim 5 wherein the turbo coding of the blocks is performed by one of a pool of forward error correction (FEC) coders.

* * * * *